3 Sheets—Sheet 1.
J. S. CONLIN.
SHOOTING-GALLERY.
No. 6,877. Reissued Jan. 25, 1876.
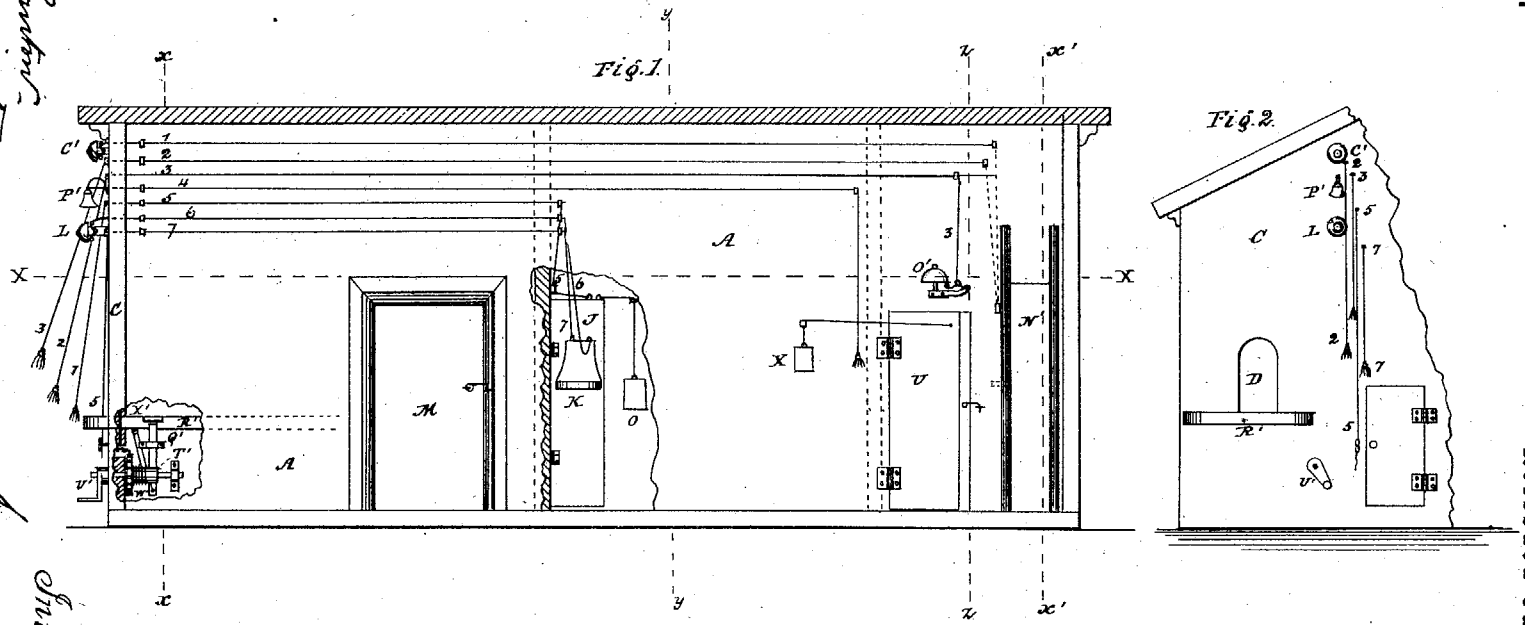
Witnesses:
Jno. S. Thornton
Geo. R. Carrington.
Inventor:
James S. Conlin
N. PETERS, PHOTO-LITHOGRAPHER, WASHINGTON, D. C.

3 Sheets—Sheet 2.

J. S. CONLIN.

SHOOTING-GALLERY.

No. 6,877.

Reissued Jan. 25, 1876.

Witnesses:

John S. Thornton

Geo. R. Carrington.

Inventor:

James S. Conlin

H. PETERS, PHOTO-LITHOGRAPHER, WASHINGTON, D. C.

J. S. CONLIN.

SHOOTING-GALLERY.

No. 6,877. Reissued Jan. 25, 1876.

Witnesses:
John S. Thornton
Geo. R. Carrington

Inventor:
James S. Conlin

N. PETERS, PHOTO-LITHOGRAPHER, WASHINGTON, D. C.

UNITED STATES PATENT OFFICE.

JAMES S. CONLIN, OF NEW YORK, N. Y.

IMPROVEMENT IN SHOOTING-GALLERIES.

Specification forming part of Letters Patent No. 78,929, dated June 16, 1868; reissue No. 6,877, dated January 25, 1876; application filed December 22, 1875.

*To all whom it may concern:*

Be it known that I, JAMES S. CONLIN, of the city, county, and State of New York, have invented new and useful Improvements in Shooting-Galleries; and I hereby declare the following to be a full, clear, and exact description thereof, reference being had to the accompanying drawings, forming part of this specification, in which—

Figure 3:
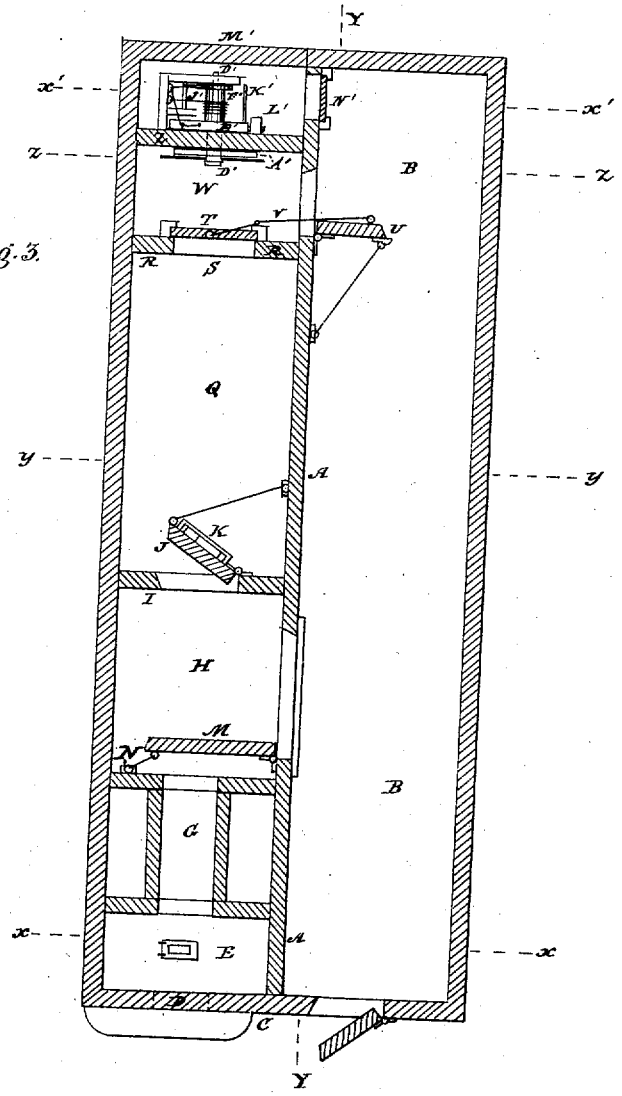
Figure 8:
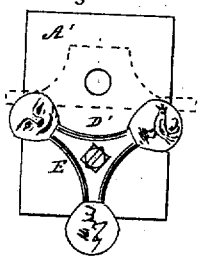
Figure 4:
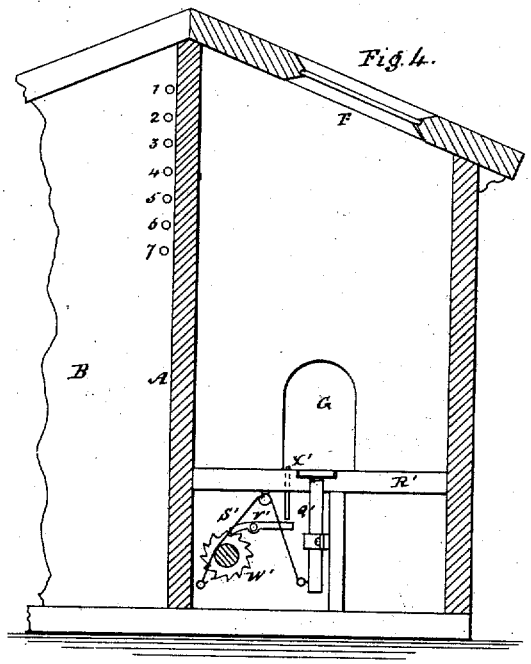
Figure 6:
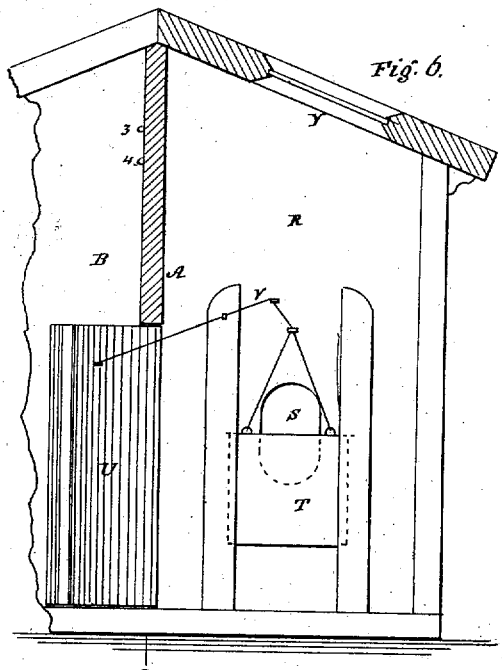
Figure 5:
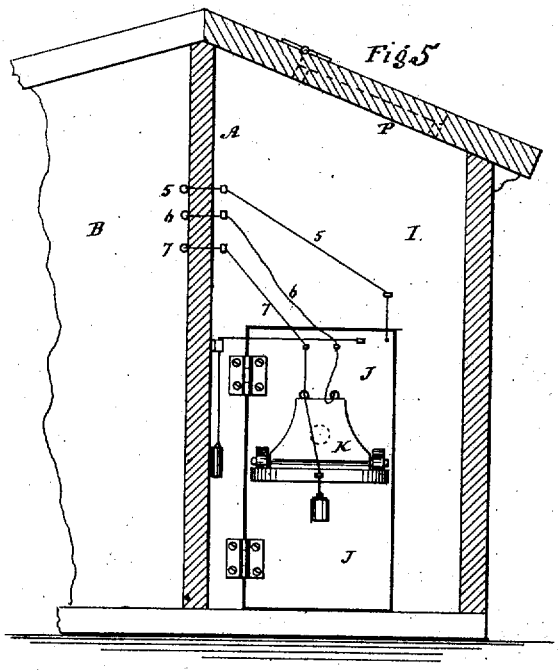
Figure 7:
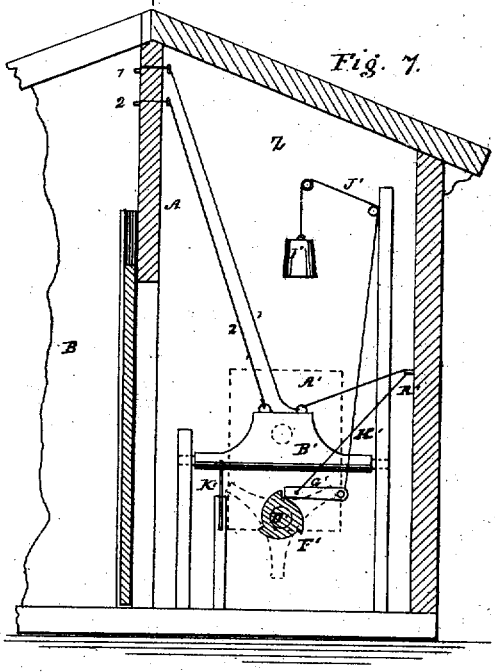

Figure 1 is a vertical longitudinal section of my improved shooting-gallery, taken through the line *y y*, Fig. 3. Fig. 2 is a partial front view of the same. Fig. 3 is a horizontal section of the same, taken through the line X X, Fig. 1. Fig. 4 is a vertical cross-section of the same, taken through the line *x x*, Figs. 1 and 3. Fig. 5 is a vertical cross-section of the same, taken through the line *y y*, Figs. 1 and 3. Fig. 6 is a vertical cross-section of the same, taken through the line *z z*, Figs. 1 and 3. Fig. 7 is a vertical cross-section of the same, taken through the line *x′ x′*, Figs. 1 and 3. Fig. 8 is a detail view of the rifle-target.

Similar letters of reference indicate corresponding parts in each of the figures.

My invention has for its object to improve the construction of shooting-galleries so as to make them convenient for use, easily operated, and entirely safe; and to avoid the disadvantages incident to a continuous tube, which latter has, prior to the introduction of my invention, been ordinarily used in shooting-galleries; and by means of my said improvements all the advantages connected with the use of a continuous tube are obtained, with the additional advantages of freedom from an accumulation of smoke and gases in the gallery, and free access with complete safety to all parts of the same, together with the advantage of being able to use several targets at different ranges in the gallery, and a material reduction in the cost of its construction.

My said invention consists in the constructions, combinations, and arrangements of the various parts, as hereinafter particularly described.

The gallery is divided into two parts by a longitudinal partition, A; or, in other words, a side gallery or passage-way, B, is formed along one side of the main gallery, running its entire length, so that the attendant can conveniently pass along it and enter the main gallery at any point where his services may be required.

C is the front of the gallery, through which, at a convenient height, is formed an opening, D, in which the arm is inserted when loaded, and from which it is not removed until fired, the arm never being capped until its muzzle has been passed through said opening, thus guarding bystanders from any danger of being injured by an accidental discharge of the arm.

E is the first compartment of the gallery, which is made short, being only of sufficient length to allow the person shooting to see the sights of the arm clearly, light for this purpose entering through a skylight or window, F, placed in the roof or cover of the gallery, as shown in Fig. 4.

The next compartment of the gallery is a low and narrow tunnel, G, the walls of which should be plated with iron, or otherwise strengthened, and which is made so narrow that it will be impossible for the arm to be turned at such an angle with the walls of said tunnel that a ball could by any chance pass through said wall, but would necessarily pass through said tunnel into the next compartment H. This tunnel G serves the same purpose as the forward end of the tube heretofore used, and is located, as shown, between the lighted compartment E and the darkened compartments hereinafter described.

The compartment H is made of such a length that the partition I, which forms the farther end of the said compartment, may be at a suitable distance from the front C, to serve as a support for a target, J, at a short range, which may be used for pistol-shooting or for short-range rifle-practice, and several of such intermediate targets may be placed in like manner at intervals along the gallery, for shooting at different ranges.

The target J is a door hinged or pivoted in a doorway in the partition I, and formed of iron, or so heavily plated with iron as to be able to resist the force of any pistol or rifle ball. The part of the target J which can be seen through the tunnel G is painted white, so that the marks of the balls can be easily seen from the front of the gallery. The bull's-eye of the target J is a round hole formed in its center, as shown in dotted lines in Fig. 5.

K is a drop-plate or block of iron, made of sufficient strength to resist the force of any pistol or rifle ball, which said drop-plate is pivoted to the rear side of the target J, and is so constructed and balanced, by a suspended weight or other suitable means that, whenever a ball hits the bull's-eye or enters the hole through the target J and strikes the said drop K, it will fall or be displaced.

To the upper edge of the drop K is attached a cord, 6, which passes through the partition A, and is led by means of guide-pulleys to the front C of the gallery, or other convenient point, where it is connected with a gong or other bell, L, so that as the drop K falls or is displaced it will ring the said bell, and thus unmistakably signal the fact that the bull's-eye has been hit.

The drop K is again raised or replaced by the attendant at the front of the gallery, by means of a cord or wire, 7, one end of which is attached to the upper end of the said drop K, passes through the partition A, and is led by guide-pulleys to the front C of the gallery, where it terminates in a tassel or other handle in such a position that it may be conveniently reached by the attendant.

Access to the chamber H, to attend to the target J, is obtained by the door M in the partition A. This door M is secured, when closed, by a hook, spring-lock, or other convenient means, and may be provided with a suspended weight, N, so arranged that as soon as it is unfastened it will swing inward, completely covering the further end of the tunnel G. It is plated with iron, or otherwise made so thick and heavy as to be ball-proof, so that should a pistol or rifle be discharged while the attendant is in the compartment H, it will be impossible for the ball to hit him, and whenever a person enters the chamber H by the door M, the latter, on being opened, will necessarily protect him.

The target J is drawn and held closed by a cord, 5, one end of which is attached to said target, passes through the partition A, and is led to the front C of the gallery by guide-pulleys, where it is secured by means of a belaying-cleat, or other convenient means. The said target J is also provided with a suspended weight, O, which, as soon as the cord or wire 5 is unfastened, draws the said target back against the partition A, out of sight and out of the range of the balls.

This target J is lighted, when in use, by means of a trap-door, P, formed in the roof or cover of the gallery, directly in front of the partition I, (as shown in dotted lines in Fig. 5,) which is kept open, when the gallery is used for short-range shooting, to light the target J, and is kept closed when a target at a longer range is used, so that the middle part of the gallery may be kept dark.

The next compartment Q is made long, and the partition R, which forms its farther end, is made with an oblong opening, S, through it. This partition R is for the purpose of excluding the light from the compartments Q and H when the target at the long range is in use, thereby bringing said target into bolder relief, so that it can be more distinctly seen from the front of the gallery.

T is a heavy iron plate, perfectly ball-proof, sliding in grooves upon the rear side of the partition R, and connected with the door U in the partition A, and which opens outward into the passage-way B by a cord, V, so that when the door U is opened to admit the attendant into the compartment W the plate T will be raised, covering the opening S in the partition R, so that it will be impossible for the attendant to be shot, even should a rifle be accidentally discharged while he is in said compartment W.

The door U, when closed, is fastened by a hook, spring-lock, or other fastening, and is provided with a suspended weight, X, which, as soon as the door U is unfastened, swings it open, and raises the ball-proof plate T, so that it is impossible for the attendant to enter the compartment W without, in so doing, securing himself against being accidentally shot.

The compartment W is made short, allowing only space for the attendant to conveniently enter and attend to the target, and is lighted through a skylight or window, Y, in the roof or cover of the gallery, which is placed directly in front of the partition Z, which forms the rear end of the said compartment W, and supports the target A′.

By this construction only the middle part of the target A′ can be seen from the front of the gallery through the opening S; the effect of the partition R being (and this is the main purpose of said partition) to shut off the light almost entirely from the middle part of the gallery, while, at the same time, bringing the middle part of the target into strong relief.

The target A′ is a heavy iron plate, completely ball-proof, and securely attached to the partition Z, and the bull's-eye is a hole formed in its center, as shown in dotted lines in Figs. 3 and 7.

To the rear of the target A′ is pivoted a ball-proof block, B′, which, when raised covers the bull's-eye of the target A′, and which is so balanced that when struck by the ball it will fall or be displaced.

To the upper end of the block B′ is attached a cord, 1, which passes through the partition A, and is led, by means of guide-pulleys, to the front of the gallery, or other convenient point, where it is connected with a bell, C′, so that whenever the bull's-eye is hit, it may at once be signaled by the ringing of the bell C′.

The block B′ is again raised or replaced by means of a cord, 2, one end of which is attached to the upper end of the block B′, and which passes through the partition A, and is led by guide-pulleys to the front of the gallery, so that the attendant at the front of the gallery can conveniently raise the said block.

D′ is a shaft, which passes through the partition Z below the target A′, and which has attached to its forward end a block or plate, E′, having three or more arms projecting from it that have heads or other fanciful designs formed upon their ends, which, when the bull's-eye has been hit, revolves one or other of these arms up in front of said bull's-eye, and which, when the block B′ is again raised, revolves the said arms again out of sight.

To the rear end of the shaft D′ is attached, or upon it is formed, a three or more toothed ratchet-wheel, F′, the pawl G′ of which is connected with the block B′ by a cord, H′, so that when the said block B′ falls or is displaced it will lift the pawl G′ away from the ratchet-wheel F′, and allow the shaft D′ and armed plate or block E′ to be revolved by the weight I′, which is connected with the said shaft D′ by a cord, J′, wound around said shaft.

K′ is a bent arm attached to the block B′, which, when the block B′ falls or is displaced, passes through a slot in the partition Z, to serve as a stop to detain the armed plate or block E′ in position for one of its arms to cover the bull's-eye of the target A′. L′ is a short compartment between the partition Z and the rear end M′ of the gallery, into which access may be had when required, through a narrow door, N′, in the partition A. O′ is a bell, placed near the door U, near which an attendant usually sits or stands, and which is connected with the front of the gallery by a cord, 3, so that the attendant at the front of the gallery can readily notify the said attendant when it is desired that he should enter the compartment W to attend to the target A′, or for any other purpose.

As soon as the attendant has retired from the compartment W and fastened the door U, he pulls the cord 4, which rings the bell P′ at the front of the gallery, and thus signals to the attendant at that point that the rear end of the gallery is again all right.

Q′ is a rest, which moves up and down vertically through a hole in the platform R′ of the compartment E, and the upper end of which is notched to receive the barrel of the gun. To the lower end of the rest Q′ is attached one end of the cord S′, which passes over a guide-pulley attached to the under side of the platform R′, and its other end is wound around, and attached to, the horizontal shaft T′, the forward end of which projects out through the front C of the gallery, and has a crank, U′, attached to it, by means of which the said shaft is revolved to raise the rest Q′ to any desired height.

The shaft T′ is held in any position to which it may be revolved by the lever-pawl V′, which takes hold of a ratchet-wheel, W′, attached to, or formed upon, the shaft T′, as shown in Figs. 1 and 4.

X′ is a rod, passing down through the platform R′, with its lower end resting upon the rear end of the lever-pawl V′, so that, by slightly pressing upon the projecting end of the said rod X′, the pawl V′ may be raised from the ratchet-wheel W′, allowing the rest Q′, by its own weight, to run down out of the way and entirely out of sight.

It should be observed that the bells L P′ C′ O′ are of different tones, so that the sound of one cannot be mistaken for the sound of the others, each one communicating its signal by its own peculiar sound.

I claim as my invention—

1. In a shooting-gallery consisting of several distinct compartments, the tunnel G, located between the lighted compartment E or front of the gallery, and the darkened compartments H and Q, as and for the purpose set forth.

2. The ball-proof door M, arranged substantially as shown and described, between the tunnel G and target J, for the purpose set forth.

3. The targets J and A′, provided with holes through their centers for bull's-eyes, and with drop-plates K and B′, connected with cords and bells, substantially as and for the purposes set forth.

4. The target J, hinged or pivoted to the partition I, so that it may be swung back out of the way, substantially as herein shown and described, for the purpose set forth.

5. The target J, when connected to the front of the gallery by means of a cord, 7, so that it may be swung to its place from the said front of the gallery, substantially as set forth.

6. The partition R, provided with an opening, S, when located at the farther end of the darkened compartment Q, and in front of the lighted compartment W, as and for the purpose set forth.

7. The arrangement, in front of the target A′, of the partition R, formed with an opening, S, and provided with a sliding ball-proof plate, T, the latter being connected by means of a cord, V, to the door U, so that when said door is opened the opening S is covered by the plate T, substantially as described, and for the purpose set forth.

8. The combination of the weighted door U and sliding ball-proof plate T with each other, and with the partition R and target A′, substantially as herein shown and described, and for the purpose set forth.

9. In a shooting-gallery divided into several compartments, the arrangement of the darkened compartment or compartments between the lighted compartment W and lighted compartment E or front of the gallery, substantially as and for the purposes herein specified.

10. The combination of the plate or block E′, having three or more arms projecting from it, shaft D′, ratchet-wheel F′, weight I′, and stop-arm K′, with each other, with the drop-plate or block B′, and the target A′, substantially as herein shown and described, and for the purpose set forth.

11. The combination of the adjustable rest Q′, shaft T′, ratchet-wheel W′, pawl V′, and rod X′, with each other and with the forward part of the gallery, substantially as herein shown and described, and for the purpose set forth.

12. An improved shooting-gallery consisting of several separate compartments, arranged substantially as described, and provided with one or more swinging targets, J, arranged in the manner set forth, for the purposes specified.

JAMES S. CONLIN.

Witnesses:
JOHN S. THORNTON,
GEO. R. CARRINGTON.